United States Patent
Endo et al.

(10) Patent No.: US 11,473,669 B2
(45) Date of Patent: Oct. 18, 2022

(54) ELECTRIC DRIVE APPARATUS

(71) Applicant: DENSO CORPORATION, Kariya (JP)

(72) Inventors: Hiroshi Endo, Kariya (JP); Ryo Tanie, Kariya (JP)

(73) Assignee: DENSO CORPORATION, Kariya (JP)

( * ) Notice: Subject to any disclaimer, the term of this patent is extended or adjusted under 35 U.S.C. 154(b) by 305 days.

(21) Appl. No.: 16/807,402

(22) Filed: Mar. 3, 2020

(65) Prior Publication Data

US 2020/0292055 A1 Sep. 17, 2020

(30) Foreign Application Priority Data

Mar. 11, 2019 (JP) .............................. JP2019-044302

(51) Int. Cl.
*H02K 9/19* (2006.01)
*F16H 57/04* (2010.01)

(52) U.S. Cl.
CPC ........... *F16H 57/0476* (2013.01); *H02K 9/19* (2013.01)

(58) Field of Classification Search
CPC .. F16H 57/04; F16H 57/0476; F16H 57/0483; H02K 5/203; H02K 5/225; H02K 9/19; H02K 7/116; H02K 7/10; H02K 2213/03; H02K 3/12; H02K 3/38; H02K 3/04; H02K 3/28; H02K 3/50; B60K 1/00; B60K 17/06
See application file for complete search history.

(56) References Cited

U.S. PATENT DOCUMENTS

| 2001/0002093 | A1* | 5/2001 | Umeda | H02K 19/24 310/201 |
| 2015/0192198 | A1* | 7/2015 | Suzuki | F16H 57/0483 475/160 |
| 2016/0218598 | A1* | 7/2016 | Hayashi | H02K 11/33 |

FOREIGN PATENT DOCUMENTS

| JP | H08-130856 A | 5/1996 |
| JP | 2014-045561 A | 3/2014 |

\* cited by examiner

*Primary Examiner* — Bryan R Perez
(74) *Attorney, Agent, or Firm* — Oliff PLC

(57) ABSTRACT

An electric drive apparatus includes a rotating electric machine and a transmission. The rotating electric machine includes a rotor, a stator and a first housing. The transmission includes a motive power transmitting unit, a second housing provided integrally with the first housing, and lubricating oil provided in the second housing to lubricate the motive power transmitting unit. The stator includes a stator coil that has first and second coil end parts respectively protruding from first and second axial end faces of a stator core. Each of phase windings of the stator coil has turn portions included in the first coil end part and joints included in the second coil end part. The second coil end part is located on the same axial side of the stator core as the transmission whereas the first coil end part is located on the opposite axial side of the stator core to the transmission.

11 Claims, 6 Drawing Sheets

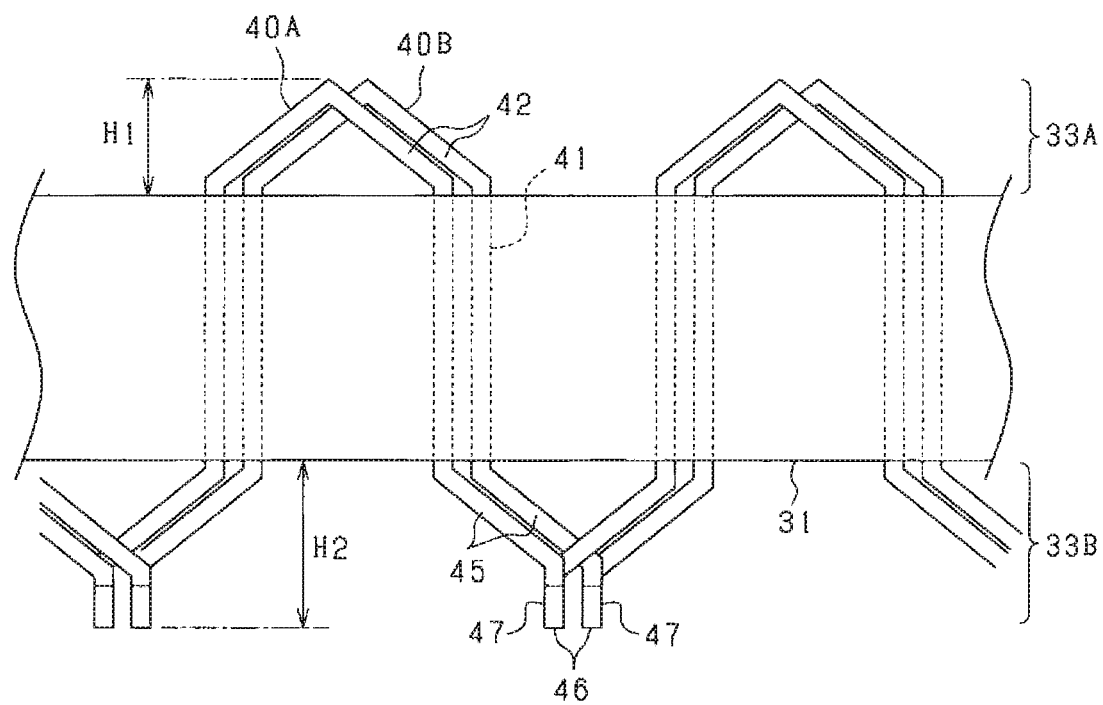

ELECTRIC DRIVE APPARATUS

CROSS-REFERENCE TO RELATED APPLICATION

This application is based on and claims priority from Japanese Patent Application No. 2019-44302 filed on Mar. 11, 2019, the contents of which are hereby incorporated by reference in their entirety into this application.

BACKGROUND

1 Technical Field

The present disclosure relates to electric drive apparatuses which include a rotating electric machine and a transmission.

2 Description of Related Art

There is known an electric drive apparatus for a vehicle. The electric drive apparatus has both a rotating electric machine and a transmission integrated thereinto. For such an electric drive apparatus, it is desired to improve the output performance and to minimize the size for improving the mountability thereof to the vehicle.

SUMMARY

According to the present disclosure, there is provided an electric drive apparatus which includes a rotating electric machine and a transmission. The rotating electric machine includes a rotor, a stator and a first housing. The rotor is provided on a rotating shaft so as to rotate together with the rotating shaft. The stator includes an annular stator core and a multi-phase stator coil. The first housing has both the rotor and the stator received therein. The transmission includes a motive power transmitting unit, a second housing and lubricating oil. The motive power transmitting unit is configured to rotate with rotation of the rotating shaft. The second housing has the motive power transmitting unit received therein. The lubricating oil is provided in the second housing to lubricate the motive power transmitting unit. Moreover, in the electric drive apparatus, the second housing is provided, on one side of the rotating electric machine in an axial direction of the rotating shaft, integrally with the first housing as one piece. The stator coil is assembled to the stator core to have first and second coil end parts respectively protruding from first and second axial end faces of the stator core. The stator coil is comprised of a plurality of phase windings. Each of the phase windings has a plurality of turn portions formed by bending and a plurality of joints at each of which sections of the phase winding are joined together. The turn portions are included in the first coil end part of the stator coil and the joints are included in the second coil end part of the stator coil. The second coil end part is located on the same axial side of the stator core as the transmission and the first coil end part is located on the opposite axial side of the stator core to the transmission.

BRIEF DESCRIPTION OF THE DRAWINGS

FIG. 3 is a developed view, in a circumferential direction, of part of the stator.

DESCRIPTION OF EMBODIMENTS

Figure 1:
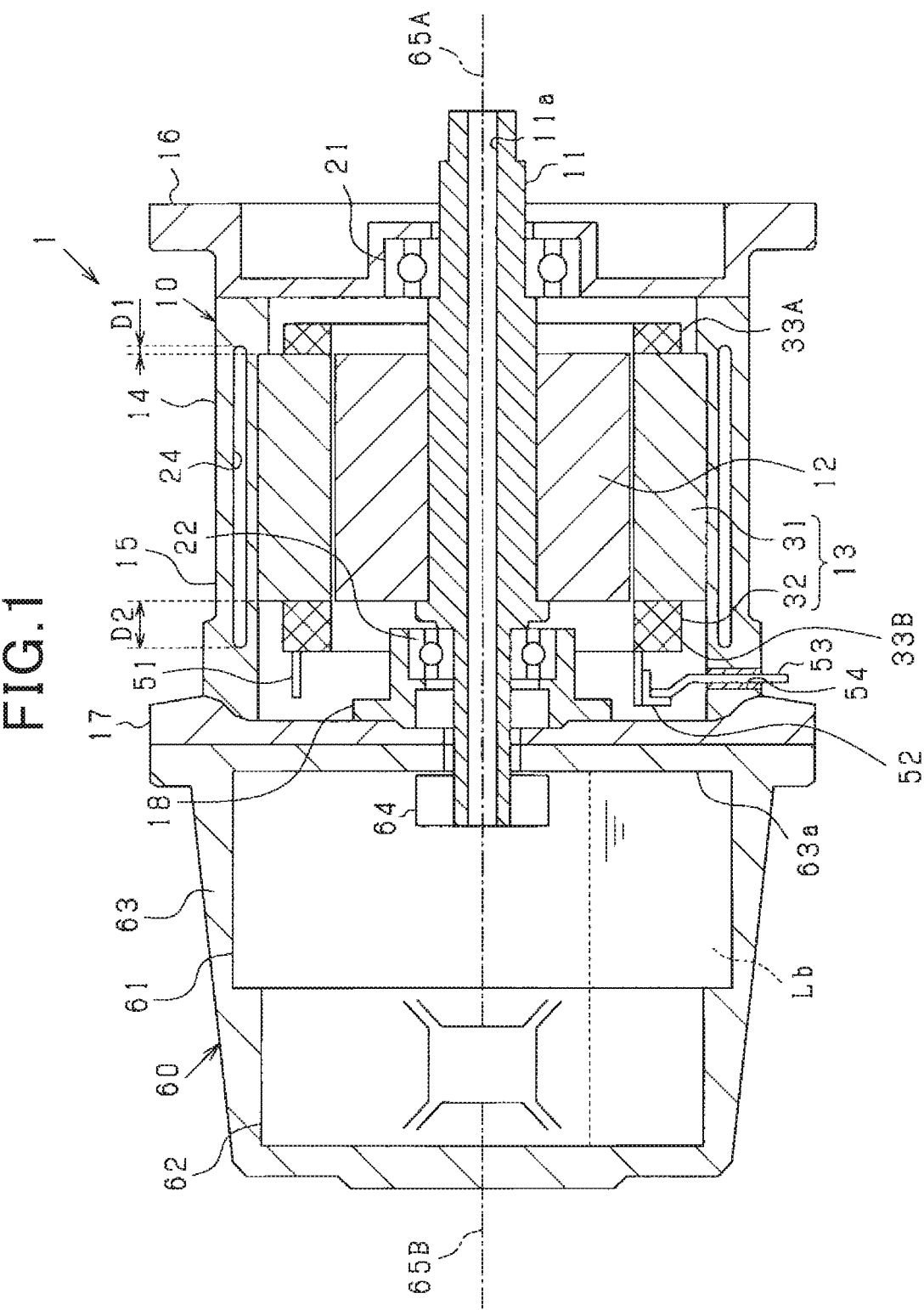
FIG. 1 is a longitudinal cross-sectional view of an electric drive apparatus according to an exemplary embodiment, the electric drive apparatus having both a rotating electric machine and a transmission integrated thereinto.

In the known electric drive apparatus (see, for example, Japanese Patent Application Publication No. JP H08-130856 A), heat generated in the rotating electric machine may be transmitted to the transmission, thereby causing thermal deterioration of lubricating oil used in the transmission. This problem becomes remarkable particularly when the output density of the rotating electric machine is increased, for example by increasing electric current supplied to a stator coil of the rotating electric machine, to improve the output performance of the electric drive apparatus.

However, no measure is taken in the known electric drive apparatus to suppress thermal deterioration of the lubricating oil due to heat generated in the rotating electric machine. Consequently, the output performance of the known electric drive apparatus may be lowered with thermal deterioration of the lubricating oil due to heat generated in the rotating electric machine.

In addition, to solve the above problem, one may consider adding a cooling portion or a heat dissipation structure to the rotating electric machine and/or the transmission. However, in this case, the size and/or the parts count of the electric drive apparatus would be increased.

In contrast, in the above-described electric drive apparatus according to the present disclosure, since the first housing and the second housing are integrally provided as one piece, the temperature of the lubricating oil provided in the second housing may be increased by heat generated in the rotating electric machine, causing thermal deterioration of the lubricating oil. In this regard, the turn portions are included in the first coil end part whereas the joints are included in the second coil end part; therefore the axial protruding height of the second coil end part from the second axial end face of the stator core is larger than the axial protruding height of the first coil end part from the first axial end face of the stator core. Accordingly, locating the second coil end part on the same axial side of the stator core as the transmission, the distance from the stator core to the transmission is increased without changing the axial length of the rotating electric machine in comparison with the case of locating the first coil end part on the same axial side of the stator core as the transmission. Consequently, it becomes possible to suppress transmission of heat from the stator to the transmission and thereby suppress thermal deterioration of the lubricating oil in the transmission while suppressing increase in the size of the electric drive apparatus.

In further implementations, for each of the phase windings of the stator coil, the sections of the phase winding may be respectively formed of electrical conductor segments. Each of the electrical conductor segments may be substantially U-shaped to have a pair of straight portions extending parallel to each other and one of the turn portions which extends, on the opposite axial side of the stator core to the transmission, to connect the pair of straight portions. Each corresponding pair of distal end portions of the electrical conductor segments may be joined together at one of the joints on the same axial side of the stator core as the transmission.

With the above configuration, it is possible to easily and reliably realize the axial protruding height of the second coil end part from the second axial end face of the stator core being larger than the axial protruding height of the first coil end part from the first axial end face of the stator core. Consequently, it becomes possible to easily and reliably secure a sufficiently long distance from the stator core to the transmission.

In addition, forming each of the phase coils of the stator coil with the electrical conductor segments, the space factor of the stator coil in the stator may be improved and thus the amount of heat generated in the rotating electric machine may be increased with improvement in the output density thereof. However, even in this case, it is still possible to reliably suppress thermal deterioration of the lubricating oil in the transmission by securing a sufficiently long distance from the stator core to the transmission.

Each of the joints may be a weld formed by welding the sections of the phase winding to each other.

With the above configuration, to suppress the influence of heat applied during the welding process, it is necessary to secure a sufficiently long distance from the stator core to distal end portions of the sections of the phase winding. Consequently, the distance from the stator core to the resultant weld (i.e., joint) becomes long, increasing the axial protruding height of the second coil end part. As a result, it becomes possible to secure a sufficiently long distance from the stator core to the transmission by utilizing the sufficiently long distance from the stator core to the distal end portions of the sections of the phase winding secured for the welding process.

In the electric drive apparatus, there may be provided, on the same axial side of the stator core as the transmission, a neutral joint at which end portions of the phase windings of the stator coil are joined together to define a neutral point of the stator coil.

With the above configuration, the distance from the stator core to the transmission can be further increased, thereby more reliably suppressing thermal deterioration of the lubricating oil in the transmission.

In the electric drive apparatus, there may be provided, on the same axial side of the stator core as the transmission, busbars through each of which electric power is inputted to and outputted from one of the phase windings of the stator coil.

With the above configuration, the distance from the stator core to the transmission can be further increased, thereby more reliably suppressing thermal deterioration of the lubricating oil in the transmission.

Each of the sections of the phase windings of the stator coil may have a substantially rectangular cross section.

With the above configuration, it is possible to improve the space factor of the stator coil in the stator and thus increase the amount of electric current flowing in the stator coil, thereby increasing the output density of the rotating electric machine. On the other hand, with increase in the output density of the rotating electric machine, the amount of heat generated in the rotating electric machine is also increased. However, even in this case, it is still possible to reliably suppress thermal deterioration of the lubricating oil in the transmission by taking the above-described measures.

The first housing may have a tubular part to which the stator core is assembled. In the tubular part of the first housing, there may be formed an annular coolant passage through which coolant flows. The coolant passage may extend axially outside the stator core on both the axial sides of the stator core. The following dimensional relationship may be preferably satisfied: D1<D2, where D1 is an axial distance between the stator core and a first axial end of the coolant passage on the opposite axial side of the stator core to the transmission and D2 is an axial distance between the stator core and a second axial end of the coolant passage on the same axial side of the stator core as the transmission.

With the coolant passage formed in the tubular part of the first housing, it is possible to suppress transmission of heat from the stator to the transmission via the first housing. Moreover, satisfying the dimensional relationship of D1<D2, it is possible to more effectively suppress transmission of heat from the stator to the transmission via the first housing; it is also possible to suitably cool the stator without making the volume of the coolant passage excessively large. In addition, by suppressing increase in the volume of the coolant passage, it is possible to suppress increase in the load of a coolant pump provided for circulation of the coolant through the coolant passage.

The transmission may have a rotation inputting portion via which the rotation of the rotating shaft is inputted and transmitted to the motive power transmitting unit. The amount of the lubricating oil provided in the second housing may be preferably set to have part of the motive power transmitting unit immersed in the lubricating oil without immersing the rotation inputting portion in the lubricating oil.

With the above configuration, compared to the motive power transmitting unit, it is easier for the rotation inputting portion to be heated by heat transmitted from the rotating electric machine to a high temperature. However, setting the amount of the lubricating oil so as not to immerse the rotation inputting portion in the lubricating oil, it is possible to more reliably suppress thermal deterioration of the lubricating oil.

The rotating electric machine may further include a terminal member via which electric power is inputted to and outputted from each of the phase windings of the stator coil. In the first housing, there may be formed a through-hole through which the terminal member extends from the inside to the outside of the first housing. The through-hole may be axially located closer than the stator core to the transmission.

With the through-hole, it is possible to more effectively suppress transmission of heat from the stator to the transmission via the first housing.

The electric drive apparatus may be configured to be used as a motive power source in a vehicle to generate motive power for rotating left and right wheels of the vehicle. The transmission may further include a differential that is received in the second housing and connected with a pair of output shafts via which the motive power is outputted to the left and right wheels of the vehicle.

With the differential received in the second housing, the thermal load on the lubricating oil in the transmission is increased. However, even in this case, it is still possible to reliably suppress thermal deterioration of the lubricating oil in the transmission by taking the above-described measures.

One exemplary embodiment will be described hereinafter with reference to the drawings. FIG. 1 shows the overall configuration of an electric drive apparatus 1 according to the exemplary embodiment.

In the present embodiment, the electric drive apparatus 1 is designed to be used in a vehicle. It should be noted that the electric drive apparatus 1 may also be used for other applications, such as industrial, marine, aviation and household applications.

As shown in FIG. 1, the electric drive apparatus 1 according to the present embodiment includes a rotating electric machine 10 and a transmission 60 that are formed integrally with each other.

In the present embodiment, the rotating electric machine 10 is configured as an inner rotor type multi-phase AC motor. In addition, the rotating electric machine 10 may be either a synchronous motor or an induction motor.

Hereinafter, the direction in which the central axis of a rotating shaft 11 of the rotating electric machine 10 extends will be referred to as axial direction; the directions of extending radially from the central axis of the rotating shaft 11 will be referred to as radial directions; and the direction of extending along a circle whose center is on the central axis of the rotating shaft 11 will be referred to as circumferential direction.

The rotating electric machine 10 includes a rotating shaft 11, a rotor 12 provided on the rotating shaft 11 so as to rotate together with the rotating shaft 11, a stator 13 located radially outside the rotor 12 so as to surround the rotor 12, and a housing 14 that receives both the rotor 12 and the stator 13 therein.

The rotor 12 and the stator 13 are coaxially arranged to radially face each other. The housing 14 is provided to surround both the rotor 12 and the stator 13 from the radially outer side and both axial sides thereof.

Specifically, the housing 14 has a tubular part 15 provided to surround both the rotor 12 and the stator 13 from the radially outer side thereof, and a pair of end plates 16 and 17 provided respectively on opposite axial sides of the tubular part 15. Both the end plates 16 and 17 are fixed to the tubular part 15 by fixing means (not shown) such as bolts. In addition, the end plate 16 constitutes an anti-transmission-side end portion of the housing 14 whereas the end plate 17 constitutes a transmission-side end portion of the housing 14.

In the present embodiment, the tubular part 15 of the housing 14 has a cylindrical shape with both axial ends thereof open; the open axial ends of the tubular part 15 are respectively covered by the end plates 16 and 17. As an alternative, the tubular part 15 may have a bottomed cylindrical shape with one axial end thereof open and the other axial end thereof closed; the open axial end of the tubular part 15 may be covered by the end plate 16 or the end plate 17.

A bearing 21 is fixed to the end plate 16 of the housing 14. On the other hand, a bearing 22 is fixed to the end plate 17 of the housing 14 via a boss 18. The rotating shaft 11 is provided to extend through through-holes formed in the central parts of the end plates 16 and 17 of the housing 14. Both the rotating shaft 11 and the rotor 12 are together rotatably supported by the housing 14 via the bearings 21 and 22.

The rotor 12 includes a rotor core, which is formed by laminating a plurality of magnetic steel sheets in the axial direction and fixed on the rotating shaft 11, and a plurality of permanent magnets retained in the rotor core.

The stator 13 is located radially outside the rotor 12 so as to radially face the rotor 12 through a predetermined air gap formed therebetween. The stator 13 includes an annular stator core 31 and a multi-phase stator coil 32. The stator core 31 is formed by laminating a plurality of annular magnetic steel sheets in the axial direction and fixing them together by, for example, staking. The stator coil 32 is, for example, a three-phase coil which includes a U-phase winding, a V-phase winding and a W-phase winding. The U-phase, V-phase and W-phase windings are star-connected (i.e., Y-connected) to define a neutral point therebetween. The stator coil 32 is assembled to the stator core 31 so as to have annular first and second coil end parts 33A and 33B respectively protruding from an opposite pair of first and second axial end faces of the stator core 31.

The stator 13 is fixed to the housing 14 with the stator core 31 fitted into the radially inner side of the tubular part 15 of the housing 14. In addition, the stator core 31 may be interference-fitted to the radially inner periphery of the tubular part 15 of the housing 14 by, for example, shrink fitting or press fitting.

In the tubular part 15 of the housing 14, there is formed an annular coolant passage 24 through which coolant flows. Specifically, the coolant passage 24 is formed so that the coolant flows in the circumferential direction between an inlet and an outlet both of which are not shown in the figures. Moreover, the coolant passage 24 is located in the axial direction to radially overlap the stator core 31.

In addition, in the present embodiment, the coolant is implemented by cooling water. It should be noted that the coolant may alternatively be implemented by, for example, lubricating oil.

In the rotating electric machine 10 configured as described above, energization of the stator coil 32 is controlled by an inverter and a controller both of which are not shown in the figures. Consequently, by controlling energization of the stator coil 32, it is possible to control torque acting on the rotating shaft 11 during operation of the rotating electric machine 10 in a torque generation mode or in an electric power generation mode.

Figure 2:
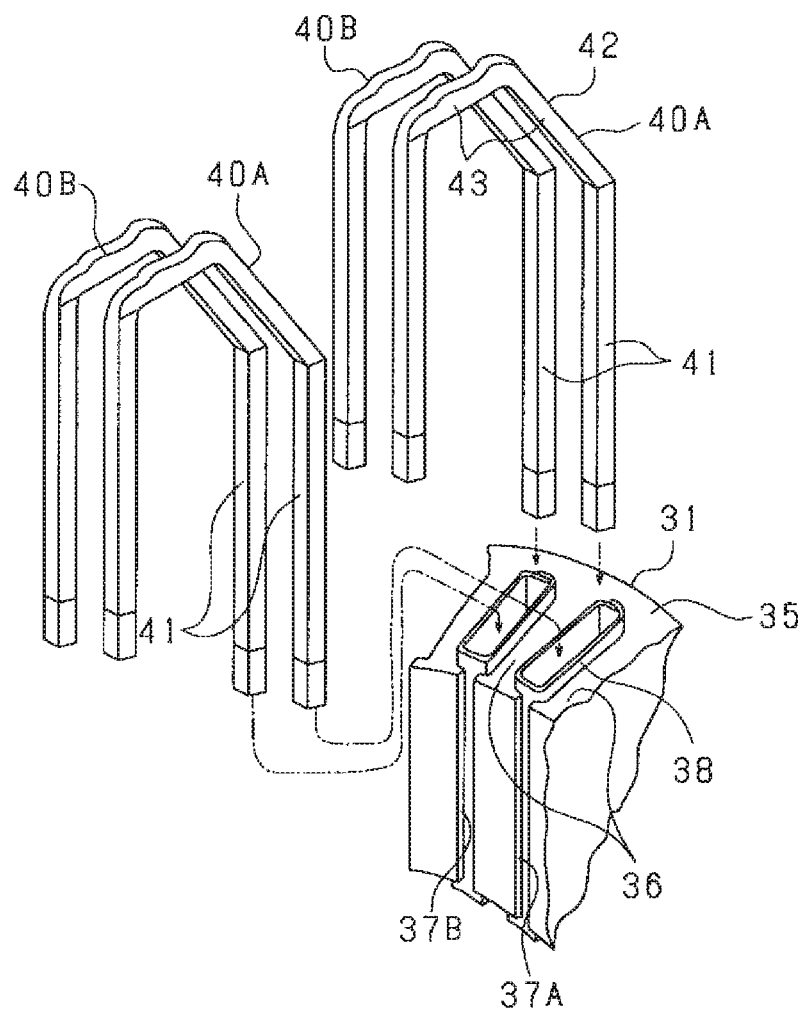
FIG. 2 is a schematic view illustrating the manner of assembling electrical conductor segments forming a stator coil to a stator core, the stator coil and the stator core together constituting a stator of the rotating electric machine.

In the present embodiment, the stator coil 32 is formed by first assembling a plurality of substantially U-shaped electrical conductor segments 40 as shown in FIG. 2 to the stator core 31 and then joining each corresponding pair of distal end portions of the electrical conductor segments 40 by welding.

FIG. 2 illustrates the manner of assembling the electrical conductor segments 40 to the stator core 31. FIG. 3 illustrates the electrical conductor segments 40 having been assembled to the stator core 31. It should be noted that for the sake of simplicity, in FIG. 3, there are shown only those of the electrical conductor segments 40 which are joined to each other to form one of the U-phase, V-phase and W-phase windings of the stator coil 32.

As shown in FIG. 2, the stator core 31 includes an annular back core 35 and a plurality of teeth 36 that each protrude radially inward from the back core 35 and are circumferentially spaced at a predetermined pitch. The stator core 31 also has a plurality of slots 37 each of which is formed between one circumferentially-adjacent pair of the teeth 36.

The slots 37 are comprised of U-phase slot groups, V-phase slot groups and W-phase slot groups which are sequentially and repeatedly arranged in the circumferential direction; each slot group including a predetermined number of the slots 37. More particularly, in the present embodiment, the slots 37 are comprised of pairs of U-phase slots 37A and 37B, V-phase slots 37A and 37B and W-phase slots 37A and 37B which are sequentially and repeatedly arranged in the circumferential direction.

For each of the slots 37, the depth direction of the slot 37 coincides with a radial direction of the stator core 31. Moreover, each of the slots 37 partially opens on a radially inner surface of the stator core 31. In addition, each of the slots 37 is formed to have a predetermined number of the electrical conductor segments 40 arranged therein in alignment with each other in the depth direction thereof (i.e., the radial direction of the stator core 31).

As shown in FIG. 2, each of the electrical conductor segments 40 is substantially U-shaped to have a pair of straight portions 41 extending parallel to each other and a turn portion 42 formed by bending to connect ends of the straight portions 41 on the same side. The straight portions 41 have a length greater than the axial thickness of the annular stator core 31. The turn portion 42 has a pair of oblique parts 43 formed respectively on opposite sides of the center of the turn portion 42 so as to extend obliquely at a predetermined angle with respect to the first axial end face (i.e., the upper end face in FIGS. 2 and 3) of the stator core 31.

In the present embodiment, the electrical conductor segments 40 are obtained by cutting and plastically deforming an electric wire that includes an electrical conductor and an insulating coat. The electrical conductor is formed of an electrically conductive metal (e.g., copper) and has a substantially rectangular cross section. The insulating coat is formed of an electrically insulative resin and provided to cover the outer surface of the electrical conductor.

The electrical conductor segments 40 are arranged in a predetermined number of radially-aligned layers in each of the slots 37 of the stator core 31. Each of the electrical conductor segments 40 has one of the straight portions 41 thereof arranged at the nth layer counting from the radially inner side in one of the slots 37 and the other of the straight portions 41 thereof arranged at the (n+1)th layer counting from the radially inner side in another one of the slots 37, where n is a natural number greater than or equal to 1.

More particularly, in the present embodiment, as mentioned previously, the slots 37 of the stator core 31 are comprised of a plurality of slot pairs each consisting of a first slot 37A and a second slot 37B; the first and second slots 37A and 37B are circumferentially adjacent to each other and belong to the same phase (i.e., the same one of the U, V and W phases). On the other hand, the electrical conductor segments 40 forming the stator coil 32 are comprised of a plurality of electrical conductor segment pairs each consisting of a first electrical conductor segment 40A and a second electrical conductor segment 40B; the first and second electrical conductor segments 40A and 40B have the same shape and size.

For each electrical conductor segment pair, the straight portions 41 of the first electrical conductor segment 40A are inserted, from a first axial side (i.e., the upper side in FIGS. 2 and 3) of the stator core 31, respectively into the first slot 37A of a first slot pair and the first slot 37A of a second slot pair; the straight portions 41 of the second electrical conductor segment 40B are inserted, from the first axial side of the stator core 31, respectively into the second slot 37B of the first slot pair and the second slot 37B of the second slot pair. That is, the first and second electrical conductor segments 40A and 40B are circumferentially offset from each other by one slot pitch. Moreover, the first slot pair and the second slot pair are located away from each other by one magnetic pole pitch (or six slot-pitches in the present embodiment). In addition, in each of the slots 37 of the stator core 31, there is provided one insulating sheet 38 to electrically insulate between the stator core 31 and the stator coil 32 (i.e., the electrical conductor segments 40).

After the insertion of the straight portions 41 of the electrical conductor segments 40 into the corresponding slots 37 of the stator core 31, for each of the electrical conductor segments 40, protruding parts of the straight portions 41 of the electrical conductor segment 40, which protrude outside the corresponding slots 37 on a second axial side (i.e., the lower side in FIGS. 2 and 3) of the stator core 31, are twisted respectively toward opposite sides in the circumferential direction so as to extend obliquely at a predetermined angle with respect to the second axial end face (i.e., the lower end face in FIGS. 2 and 3) of the stator core 31. Consequently, each of the protruding parts of the straight portions 41 is transformed into an oblique part 45 of the electrical conductor segment 40; the oblique part 45 extends in the circumferential direction of the stator core 31 for substantially half a magnetic pole pitch.

Then, as shown in FIG. 3, on the second axial side of the stator core 31, each corresponding pair of distal end portions 47 of the electrical conductor segments 40 (i.e., end portions 47 of the electrical conductor segments 40 on the opposite side to the turn portions 42) are joined (e.g., by welding), forming a joint (or weld) 46 therebetween. Consequently, all the electrical conductor segments 40 are electrically connected in a predetermined pattern, thereby forming the stator coil 32.

More specifically, the distal end portions 47 of the electrical conductor segments 40 are exposed from the respective insulating coats, forming exposed portions 47 of the electrical conductor segments 40. Each of the joints 46 is formed between one corresponding pair of the exposed portions 47 of the electrical conductor segments 40.

As shown in FIG. 3, the stator coil 32, which is assembled to the stator core 31 in the above-described manner, has the first coil end part 33A located on the first axial side (i.e., the upper side in FIG. 3) of the stator core 31 and the second coil end part 33B located on the second axial side (i.e., the lower side in FIG. 3) of the stator core 31. The first coil end part 33A is constituted of the turn portions 42 of the electrical conductor segments 40 which protrude from the first axial end face (i.e., the upper end face in FIG. 3) of the stator core 31. The second coil end part 33B is constituted of the oblique parts 45 of the electrical conductor segments 40, which protrude from the second axial end face (i.e., the lower end face in FIG. 3) of the stator core 31, and the joints 46 formed between the exposed portions 47 of the electrical conductor segments 40. In addition, as shown in FIG. 3, the joints 46 are formed to extend substantially parallel to the axial direction.

With the above configuration of the stator coil 32 according to the present embodiment, the axial protruding heights of the first and second coil end parts 33A and 33B respectively from the first and second axial end faces of the stator core 31 are different from each other.

More specifically, in the present embodiment, the following dimensional relationship is satisfied: H1<H2, where H1 is the axial protruding height of the first coil end part 33A from the first axial end face of the stator core 31 and H2 is the axial protruding height of the second coil end part 33B from the second axial end face of the stator core 31.

As described above, in the present embodiment, the first coil end part 33A is constituted of the turn portions 42 of the electrical conductor segments 40 whereas the second coil end part 33B is constituted of the oblique parts 45 of the electrical conductor segments 40 and the joints 46 formed between the distal end portions 47 (i.e., the exposed portions 47) of the electrical conductor segments 40. In the second coil end part 33B, it is necessary to superpose and join each corresponding pair of the distal end portions 47 of the electrical conductor segments 40. Consequently, the axial protruding height H2 of the second coil end part 33B becomes larger than the axial protruding height H1 of the first coil end part 33A.

In particular, in the case of joining each corresponding pair of the distal end portions 47 of the electrical conductor segments 40 by welding, it is necessary to secure a sufficiently long distance from the stator core 31 to the distal end portions 47 during the welding process; it is also necessary to secure a sufficient weld zone at the distal end portions 47 of the electrical conductor segments 40. Consequently, the axial protruding height H2 of the second coil end part 33B becomes considerably larger than the axial protruding height H1 of the first coil end part 33A.

In addition, the left-right direction in FIG. 1 coincides with the axial direction; the first and second coil end parts 33A and 33B respectively denote the right and left coil end parts of the stator coil 32 in FIG. 1.

Figure 4A:
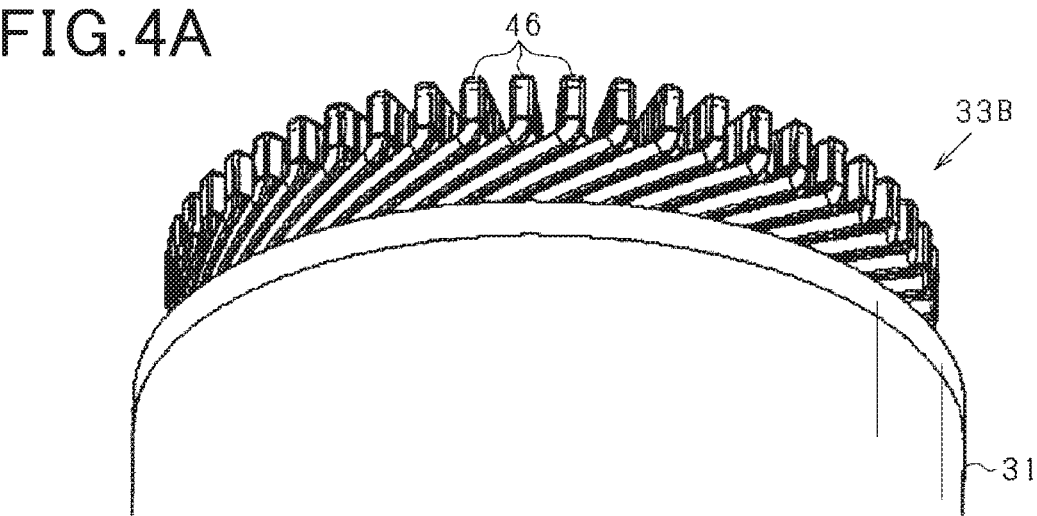
FIG. 4A is a perspective view showing joints formed between the electrical conductor segments assembled to the stator core.

FIG. 4A shows the joints 46 formed between the distal end portions 47 of the electrical conductor segments 40. As can be seen from FIG. 4A, the joints 46 are spaced from each other; moreover, the joints 46 are aligned in each of the circumferential and radial directions.

Figure 4B:
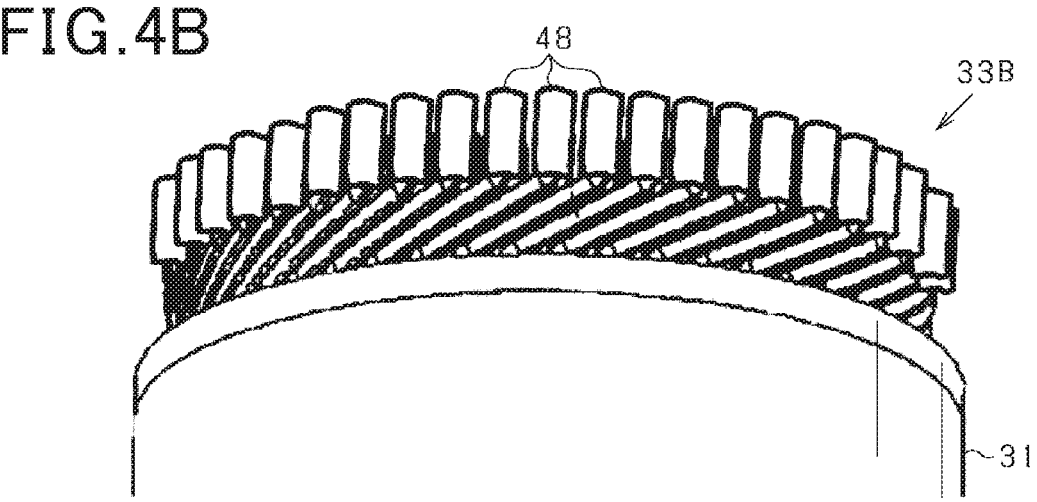
FIG. 4B is a perspective view illustrating a configuration example of the stator where each of the joints is individually covered by an insulating coat formed thereon.

FIG. 4B illustrates a configuration example of the stator 13 where each of the joints 46 is individually covered by an insulating coat 48 formed thereon. In addition, the insulating coat 48 may be formed, for example, of an electrically-insulative synthetic resin.

Figure 4C:
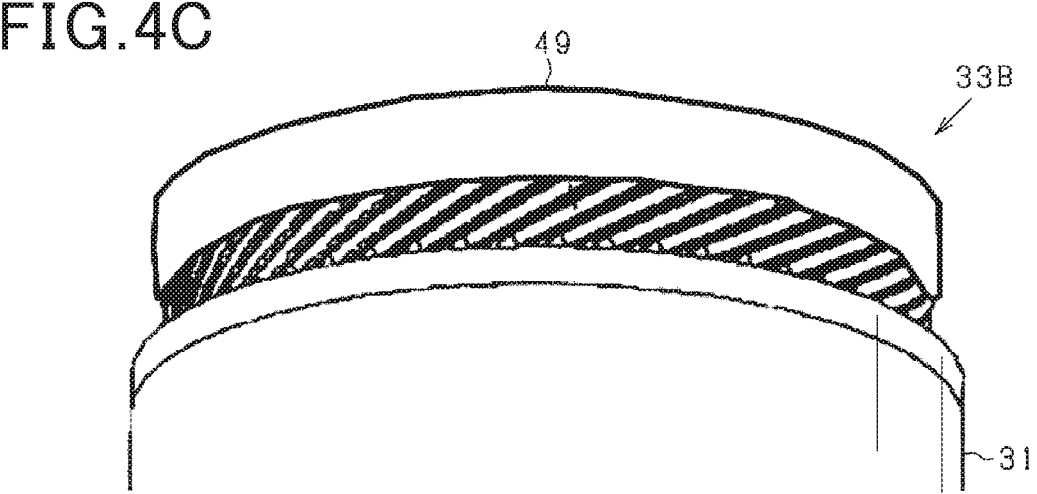
FIG. 4C is a perspective view illustrating another configuration example of the stator where all the joints are together embedded in an annular insulating layer formed by resin molding.

FIG. 4C illustrates another configuration example of the stator 13 where all the joints 46 are together embedded in an annular insulating layer 49 formed by resin molding.

In the present embodiment, there is provided, on the same axial side of the stator core 31 as the transmission 60 (i.e., on the left side of the stator core 31 in FIG. 1), a neutral joint 51 at which end portions of the U-phase, V-phase and W-phase windings of the stator coil 32 are joined together to define the neutral point of the stator coil 32. More specifically, as shown in FIG. 1, at the neutral joint 51, the end portions of the U-phase, V-phase and W-phase windings of the stator coil 32 are superposed along the axial direction and joined together by, for example, welding.

Moreover, in the present embodiment, there are also provided, on the same axial side of the stator core 31 as the transmission 60, busbars 52 through which electric power is inputted to and outputted from the U-phase, V-phase and W-phase windings of the stator coil 32. Each of the busbars 52 is provided for a corresponding one of the phase windings of the stator coil 32. More specifically, each of the busbars 52 is connected with an end portion of the corresponding phase winding on the opposite side to the neutral point. Moreover, the busbars 52 are connected with a terminal member 53 via which electric power is inputted to and outputted from the busbars 52. In addition, all the busbars 52 may be integrated, for example by resin molding, into a busbar module.

The terminal member 53 protrudes, from the busbars 52, outside the housing 14 through a through-hole 54 formed in the tubular part 15 of the housing 14, so as to be connected to an electric power harness (not shown). The terminal member 53 has electric power paths provided therein in alignment with each other in a width direction of the terminal member 53 (i.e., the direction perpendicular to the paper surface of FIG. 1); the electric power paths respectively correspond to the U, V and W phases of the stator coil 32. The through-hole 54 is formed to be long in the width direction of the terminal member 53, so as to allow the terminal member 53 to extend from the inside to the outside of the housing 14 through the through-hole 54. More particularly, in the present embodiment, the through-hole 54 is formed, in the tubular part 15 of the housing 14, to be longer in the circumferential direction than in the radial direction. In addition, in the through-hole 54, there is filled a sealant to seal the gap between the terminal member 53 and the interior wall surface of the through-hole 54.

The electric drive apparatus 1 according to the present embodiment is configured to be used as a motive power source in a vehicle to generate motive power (or torque) for rotating left and right wheels of the vehicle.

Specifically, the motive power generated by the rotating electric machine 10 is transmitted to the wheels of the vehicle via the transmission 60, thereby enabling the vehicle to run. In particular, in the present embodiment, a differential 62 is provided in the transmission 60 to divide the motive power between the left and right wheels of the vehicle.

As shown in FIG. 1, the transmission 60 includes a motive power transmitting unit 61 for transmitting the motive power generated by the rotating electric machine 10, the aforementioned differential 62, and a housing 63 that receives both the motive power transmitting unit 61 and the differential 62 therein.

In the housing 63, there is provided lubricating oil Lb for lubricating both the motive power transmitting unit 61 and the differential 62. The amount of the lubricating oil Lb is set to have only part of the volume of the housing 63 occupied by the lubricating oil Lb. In other words, the internal space of the housing 63 is partially filled with the lubricating oil Lb.

The housing 63 has a flat end wall 63a provided at one axial end thereof. The end wall 63a of the housing 63 of the transmission 60 and the end plate 17 of the housing 14 of the rotating electric machine 10 are arranged to abut each other and joined together by joining means such as bolts. That is, the housing 63 of the transmission 60 is provided, on one axial side (i.e., the left side in FIG. 1) of the rotating electric machine 10, integrally with the housing 14 of the rotating electric machine 10 into one piece. Consequently, the rotating electric machine 10 and the transmission 60 are integrated into a unitary structure.

The transmission 60 has a rotation inputting portion 64 provided integrally with the rotating shaft 11 of the rotating electric machine 10 so as to rotate together with the rotating shaft 11. The rotation of the rotating shaft 11 is inputted to the transmission 60 via the rotation inputting portion 64; then the rotation is outputted from a pair of output shafts 65A and 65B of the transmission 60 via the motive power transmitting unit 61 and the differential 62. More specifically, the rotation inputted via the rotation inputting portion 64 is increased or decreased in speed in the transmission 60 and then outputted from the output shafts 65A and 65B. With the rotation of the output shafts 65A and 65B, the left and right wheels of the vehicle also rotate.

It should be noted that FIG. 1 only schematically illustrates the configuration of the electric drive apparatus 1 where: the rotating electric machine 10 and the transmission 60 are coaxially arranged; and the output shaft 65A, which is one of the pair of output shafts 65A and 65B of the transmission 60, is configured to extend through a hollow portion 11a of the rotating shaft 11.

Though not shown in detail in FIG. 1, the rotating shaft 11 is inserted in both the through-hole formed in the end plate 17 of the housing 14 of the rotating electric machine 10 and a through-hole formed in the end wall 63a of the housing 63 of the transmission 60. Moreover, seal members (e.g., sliding seals) are provided between the outer circumferential surface of the rotating shaft 11 and the interior wall surface of the through-hole formed in the end plate 17 of the housing 14 and between the outer circumferential surface of the rotating shaft 11 and the interior wall surface of the through-hole formed in the end wall 63a of the housing 63. Consequently, with the seal members, it becomes possible to isolate the internal space of the housing 14 of the rotating electric machine 10 and the internal space of the housing 63 of the transmission 60 from each other while allowing the rotating shaft 11 to rotate.

In the present embodiment, the electric drive apparatus 1 is designed to be mounted to the vehicle with the rotating shaft 11 extending in the horizontal direction (i.e., the left-right direction in FIG. 1). The amount of the lubricating oil Lb provided in the housing 63 of the transmission 60 is set to have part of the motive power transmitting unit 61 immersed in the lubricating oil Lb without immersing the rotation inputting portion 64 in the lubricating oil Lb. Moreover, the amount of the lubricating oil Lb provided in the housing 63 may be adjusted, according to the change in the oil level with acceleration/deceleration of the vehicle, to prevent the rotation inputting portion 64 from being immersed in the lubricating oil Lb even when the oil level rises with acceleration/deceleration of the vehicle. In addition, in the housing 63, there may be formed an oil drain hole through which the amount of the lubricating oil Lb provided in the housing 63 can be adjusted.

Next, the configuration of the transmission 60 according to the present embodiment will be described in detail with reference to FIG. 5.

In the present embodiment, the motive power transmitting unit 61 of the transmission 60 is implemented by a double-pinion planetary gear mechanism 70. The planetary gear mechanism 70 includes a ring gear 71 having internal teeth formed therein, a sun gear 72 having external teeth formed therein, a pair of pinion gears 73 and 74 arranged coaxially with each other, and a carrier 75 rotatably supporting the pair of pinion gears 73 and 74. The ring gear 71 is fixed to the housing 63 of the transmission 60. The sun gear 72 may be provided, as the rotation inputting portion 64 of the transmission 60, integrally with the rotating shaft 11 so as to rotate together with the rotating shaft 11. Of the pair of pinion gears 73 and 74, the pinion gear 73 is arranged to mesh with the ring gear 71 while the pinion gear 74 is arranged to mesh with the sun gear 72. The carrier 75 is fixed to a case 81 of the differential 62.

It should be noted that the planetary gear mechanism 70 may alternatively include a plurality of pairs of pinion gears 73 and 74. Moreover, it also should be noted that the rotation inputting portion 64 may alternatively be constituted of a spline and the sun gear 72 may be fixed to the spline.

The differential 62 includes the aforementioned case 81, a plurality of pinion gears 82 provided in the case 81, and a pair of side gears 83 provided in the case 81 and joined respectively to the output shafts 65A and 65B by spline fitting, press fitting or the like.

Moreover, in the transmission 60, the rotating shaft 11 is rotatably supported by a bearing 85. The carrier 75 of the planetary gear mechanism 70 is rotatably supported by a bearing 86. The case 81 of the differential 62 is rotatably supported by a bearing 87.

In the transmission 60 configured as described above, during rotation of the rotating shaft 11 (i.e., during rotation of the rotor 12), the pinion gears 73 and 74 rotate with rotation of the sun gear 72. Further, with the rotation of the pinion gears 73 and 74, the carrier 75 rotates together with the case 81 of the differential 62. That is, the rotation of the rotating shaft 11 is transmitted to the case 81 of the differential 62 through speed reduction by the planetary gear mechanism 70 at a given reduction ratio. Moreover, the rotation of the case 81 of the differential 62 is further transmitted to the output shafts 65A and 65B through the mesh between the pinion gears 82 and the side gears 83. When the output shafts 65A and 65B rotate at different speeds during the travelling of the vehicle around a corner, the motive power is suitably divided by the differential 62 between the output shafts 65A and 65B and thus between the left and right wheels of the vehicle.

In the electric drive apparatus 1 according to the present embodiment, the lubricating oil Lb provided in the housing 63 of the transmission 60 may be deteriorated due to heat generated in the rotating electric machine 10. Therefore, in the present embodiment, the following measures are taken to suppress thermal deterioration of the lubricating oil Lb due to heat generated in the rotating electric machine 10.

As described above, in the stator 13 of the rotating electric machine 10, the axial protruding heights H1 and H2 of the first and second coil end parts 33A and 33B of the stator coil 32 respectively from the first and second axial end faces of the stator core 31 are different from each other. More specifically, the axial protruding height H2 of the second coil end part 33B from the second axial end face of the stator core 31 is larger than the axial protruding height H1 of the first coil end part 33A from the first axial end face of the stator core 31 (see FIG. 3). Therefore, in the present embodiment, the rotating electric machine 10 is assembled to the transmission 60 so that the second coil end part 33B is located on the same axial side of the stator core 31 as the transmission 60 (i.e., on the left side of the stator core 31 in FIG. 1) whereas the first coil end part 33A is located on the opposite axial side of the stator core 31 to the transmission 60 (i.e., on the right side of the stator core 31 in FIG. 1). Consequently, the distance from the stator core 31 to the transmission 60 is increased in comparison with the case of locating the first coil end part 33A on the same axial side of the stator core 31 as the transmission 60.

More specifically, in the second coil end part 33B, there are included the joints 46 formed between the distal end portions 47 (i.e., the exposed portions 47) of the electrical conductor segments 40 forming the stator coil 32 (see FIG. 3). To form the joints 46, each corresponding pair of the distal end portions 47 of the electrical conductor segments 40 are superposed and joined together. Consequently, the axial protruding height H2 of the second coil end part 33B becomes larger than the axial protruding height H1 of the first coil end part 33A.

In particular, when each corresponding pair of the distal end portions 47 of the electrical conductor segments 40 are joined by welding, to suppress the influence of heat applied during the welding process, it is necessary to secure a sufficiently long distance from the stator core 31 to the distal end portions 47. Consequently, the distance from the stator core 31 to the resultant weld (i.e., joint 46) becomes long, increasing the axial protruding height H2 of the second coil end part 33B.

Moreover, in the present embodiment, there are provided, on the same axial side of the stator core 31 as the transmission 60, the neutral joint 51 defining the neutral point of the stator coil 32 as well as the busbars 52 connected respectively with the phase windings of the stator coil 32. Consequently, the distance from the stator core 31 to the transmission 60 is further increased.

When the temperature of the stator 13 is increased due to heat generated with supply of electric power to the stator coil 32, the heat will be first transmitted from the stator core 31 to the housing 14 and then transmitted from the housing 14 to the transmission 60. However, setting the distance from the stator core 31 to the transmission 60 to be sufficiently long, it becomes possible to achieve reduction in the amount of the heat transmitted to the transmission 60. Moreover, locating the second coil end part 33B on the same axial side of the stator core 31 as the transmission 60, the axial length of the rotating electric machine 10 remains unchanged in comparison with the case of locating the first coil end part 33A on the same axial side of the stator core 31 as the transmission 60 (i.e., locating the second coil end part 33B on the opposite axial side of the stator core 31 to the transmission 60). Consequently, it becomes possible to suppress increase in the size of the rotating electric machine 10 and thus increase in the size of the entire electric drive apparatus 1.

In the present embodiment, as shown in FIG. 1, the coolant passage 24 is formed in the tubular part 15 of the housing 14 to extend axially outside the stator core 31 on both the axial sides of the stator core 31. Moreover, the axial distances between the stator core 31 and a first axial end of the coolant passage 24 on the opposite axial side of the stator core 31 to the transmission 60 and between the stator core 31 and a second axial end of the coolant passage 24 on the same axial side of the stator core 31 as the transmission 60 are different from each other. More specifically, in the present embodiment, the following dimensional relationship is satisfied: D1<D2, where D1 is the axial distance between the stator core 31 and the first axial end of the coolant passage 24 on the opposite axial side of the stator core 31 to the transmission 60 and D2 is the axial distance between the stator core 31 and the second axial end of the coolant passage 24 on the same axial side of the stator core 31 as the transmission 60. That is, the second axial end of the coolant passage 24 is axially located closer than the stator core 31 to the transmission 60.

It should be noted that the coolant passage 24 may alternatively be formed to extend axially outside the stator core 31 only on the same axial side of the stator core 31 as the transmission 60.

In the present embodiment, as shown in FIG. 1, the through-hole 54, which is formed in the tubular part 15 of the housing 14 and through which the terminal member 53 extends, is axially located closer than the stator core 31 to the transmission 60. Consequently, transmission of heat from the stator 13 to the transmission 60 via the housing 14 is impeded by the through-hole 54.

More specifically, in the present embodiment, the through-hole 54 is formed within part of the entire circumference of the tubular part 15 of the housing 14 (in other words, within an angular range less than 360°. In the state of the electric drive apparatus 1 being mounted to the vehicle, the through-hole 54 is located vertically below the upper surface (or level) of the lubricating oil Lb provided in the housing 63 of the transmission 60 (see FIG. 1). Consequently, with the through-hole 54, it becomes possible to more effectively suppress transmission of heat from the housing 14 of the rotating electric machine 10 to the lubricating oil Lb provided in the housing 63 of the transmission 60.

According to the present embodiment, it is possible to achieve the following advantageous effects.

The electric drive apparatus 1 according to the present embodiment includes the rotating shaft 10 and the transmission 60. The rotating electric machine 10 includes the rotor 12, the stator 13 and the housing 14. The rotor 12 is provided on the rotating shaft 11 so as to rotate together with the rotating shaft 11. The stator 13 includes the annular stator core 31 and the three-phase stator coil 32. The housing 14 has both the rotor 12 and the stator 13 received therein. The transmission 60 includes the motive power transmitting unit 61, the housing 63 and the lubricating oil Lb. The motive power transmitting unit 61 is configured to rotate with rotation of the rotating shaft 11. The housing 63 has the motive power transmitting unit 61 received therein. The lubricating oil Lb is provided in the housing 63 to lubricate the motive power transmitting unit 61. Moreover, in the electric drive apparatus 1, the housing 63 of the transmission 60 is provided, on one axial side (i.e., the left side in FIG. 1) of the rotating electric machine 10, integrally with the housing 14 of the rotating electric machine 10 into one piece. Consequently, both the rotating electric machine 10 and the transmission 60 are integrated into a unitary structure. The stator coil 32 is assembled to the stator core 31 to have the first and second coil end parts 33A and 33B respectively protruding from the first and second axial end faces of the stator core 31. The stator coil 32 is comprised of the U-phase, V-phase and W-phase windings. Each of the phase windings of the stator coil 32 has the turn portions 42 formed by bending and the joints 46 at each of which two sections of the phase winding (more particularly, two electrical conductor segments 40 forming the phase winding in the present embodiment) are joined together. The turn portions 42 are included in the first coil end part 32A whereas the joints 46 are included in the second coil end part 32B. The second coil end part 32B is located on the same axial side of the stator core 31 as the transmission 60 whereas the first coil end part 32A is located on the opposite axial side of the stator core 31 to the transmission 60.

With the above configuration, since the housing 14 of the rotating electric machine 10 and the housing 63 of the transmission 60 are integrally provided into one piece, the temperature of the lubricating oil Lb provided in the housing 63 may be increased by heat generated in the rotating electric machine 10, causing thermal deterioration of the lubricating oil Lb. In this regard, the turn portions 42 are included in the first coil end part 32A whereas the joints 46 are included in the second coil end part 32B; therefore the axial protruding height H2 of the second coil end part 33B from the second axial end face of the stator core 31 is larger than the axial protruding height H1 of the first coil end part 33A from the first axial end face of the stator core 31. Accordingly, locating the second coil end part 33B on the same axial side of the stator core 31 as the transmission 60, the distance from the stator core 31 to the transmission 60 is increased without changing the axial length of the rotating electric machine 10 in comparison with the case of locating the first coil end part 33A on the same axial side of the stator core 31 as the transmission 60. Consequently, it becomes possible to suppress transmission of heat from the stator 13 to the transmission 60 and thereby suppress thermal deterioration of the lubricating oil Lb in the transmission 60 while suppressing increase in the size of the electric drive apparatus 1.

In the present embodiment, each of the U-phase, V-phase and W-phase windings of the stator coil 32 is formed of a plurality of electrical conductor segments 40. In other words, for each of the phase windings of the stator coil 32, the sections of the phase winding, which are joined to one another at the joints 46, are respectively formed of the electrical conductor segments 40. Each of the electrical conductor segments 40 is substantially U-shaped to have the pair of straight portions 41 extending parallel to each other and one of the turn portions 42 of the phase winding which extends, on the opposite axial side of the stator core 31 to the transmission 60, to connect the pair of straight portions 41. Each corresponding pair of the distal end portions 47 of the electrical conductor segments 40 are joined together at one of the joints 46 on the same axial side of the stator core 31 as the transmission 60.

With the above configuration, it becomes possible to easily and reliably realize the axial protruding height H2 of the second coil end part 33B from the second axial end face of the stator core 31 being larger than the axial protruding height H1 of the first coil end part 33A from the first axial end face of the stator core 31. Consequently, it becomes possible to easily and reliably secure a sufficiently long distance from the stator core 31 to the transmission 60.

In addition, forming each of the phase coils of the stator coil 32 with the electrical conductor segments 40, the space factor of the stator coil 32 in the stator 13 may be improved and thus the amount of heat generated in the rotating electric machine 10 may be increased with improvement in the output density thereof. However, even in this case, it is still possible to reliably suppress thermal deterioration of the lubricating oil Lb in the transmission 60 by securing a sufficiently long distance from the stator core 31 to the transmission 60.

In the present embodiment, the electrical conductor segments 40 are joined to one another by welding. That is, each of the joints 46 formed between the electrical conductor segments 40 is a weld.

With the above configuration, to suppress the influence of heat applied during the welding process, it is necessary to secure a sufficiently long distance from the stator core 31 to the distal end portions 47 of the electrical conductor segments 40. Consequently, the distance from the stator core 31 to the resultant weld (i.e., joint 46) becomes long, increasing the axial protruding height H2 of the second coil end part 33B. As a result, it becomes possible to secure a sufficiently long distance from the stator core 31 to the transmission 60 by utilizing the sufficiently long distance from the stator core 31 to the distal end portions 47 of the electrical conductor segments 40 secured for the welding process.

In the present embodiment, the joints 46 are covered with an electrically insulative material (see FIGS. 4B and 4C).

With the above configuration, it becomes possible to improve the electrical insulation between the phase windings of the stator coil 32 at the second coil end part 33B while suppressing transmission of heat from the second coil end part 33B to the transmission 60.

In the present embodiment, there is provided, on the same axial side of the stator core 31 as the transmission 60, the neutral joint 51 at which the end portions of the phase windings of the stator coil 32 are joined together to define the neutral point of the stator coil 32.

With the above configuration, the distance from the stator core 31 to the transmission 60 is further increased, thereby more reliably suppressing thermal deterioration of the lubricating oil Lb in the transmission 60.

In the present embodiment, there are provided, on the same axial side of the stator core 31 as the transmission 60, the busbars 52 through each of which electric power is inputted to and outputted from one of the phase windings of the stator coil 32.

With the above configuration, the distance from the stator core 31 to the transmission 60 is further increased, thereby more reliably suppressing thermal deterioration of the lubricating oil Lb in the transmission 60.

In the present embodiment, each of the electrical conductor segments 40 forming the phase windings of the stator coil 32 has a substantially rectangular cross section.

With the above configuration, it becomes possible to improve the space factor of the stator coil 32 in the stator 13 and thus increase the amount of electric current flowing in the stator coil 32, thereby increasing the output density of the rotating electric machine 10. On the other hand, with increase in the output density of the rotating electric machine 10, the amount of heat generated in the rotating electric machine 10 is also increased. However, even in this case, it is still possible to reliably suppress thermal deterioration of the lubricating oil Lb in the transmission 60 by taking the above-described measures.

In the present embodiment, the housing 14 of the rotating electric machine 10 has the tubular part 15 to which the stator core 31 is assembled. In the tubular part 15 of the housing 14, there is formed the annular coolant passage 24 through which the coolant flows. The coolant passage 24 extends axially outside the stator core 31 on both the axial sides of the stator core 31. Moreover, the flowing dimensional relationship is satisfied: D1<D2, where D1 is the axial distance between the stator core 31 and the first axial end of the coolant passage 24 on the opposite axial side of the stator core 31 to the transmission 60 and D2 is the axial distance between the stator core 31 and the second axial end of the coolant passage 24 on the same axial side of the stator core 31 as the transmission 60.

With the coolant passage 24 formed in the tubular part 15 of the housing 14, it becomes possible to suppress transmission of heat from the stator 13 to the transmission 60 via the housing 14. Moreover, satisfying the dimensional relationship of D1<D2, it becomes possible to more effectively suppress transmission of heat from the stator 13 to the transmission 60 via the housing 14; it also becomes possible to suitably cool the stator 13 without making the volume of the coolant passage 24 excessively large. In addition, by suppressing increase in the volume of the coolant passage 24, it becomes possible to suppress increase in the load of a coolant pump (not shown) provided for circulation of the coolant through the coolant passage 24.

In the present embodiment, the transmission 60 has the rotation inputting portion 64 via which the rotation of the rotating shaft 11 is inputted and transmitted to the motive power transmitting unit 61. The amount of the lubricating oil Lb provided in the housing 63 of the transmission 60 is set to have part of the motive power transmitting unit 61 immersed in the lubricating oil Lb without immersing the rotation inputting portion 64 in the lubricating oil Lb.

With the above configuration, compared to the motive power transmitting unit 61, it is easier for the rotation inputting portion 64 to be heated by heat transmitted from the rotating electric machine 10 to a high temperature. However, setting the amount of the lubricating oil Lb so as not to immerse the rotation inputting portion 64 in the lubricating oil Lb, it becomes possible to more reliably suppress thermal deterioration of the lubricating oil Lb.

In the present embodiment, the rotating electric machine 10 includes the terminal member 53 via which electric power is inputted to and outputted from each of the phase windings of the stator coil 32. In the housing 14 of the rotating electric machine 10, there is formed the through-hole 54 through which the terminal member 53 extends from the inside to the outside of the housing 14. The through-hole 54 is axially located closer than the stator core 31 to the transmission 60.

With the through-hole 54, it becomes possible to more effectively suppress transmission of heat from the stator 13 to the transmission 60 via the housing 14.

In the present embodiment, the electric drive apparatus 1 is configured to be used as a motive power source in a vehicle to generate motive power for rotating left and right wheels of the vehicle. The transmission 60 includes the differential 62 that is received in the housing 63 and connected with the pair of output shafts 65A and 65B via which the motive power is outputted to the left and right wheels of the vehicle.

With the differential 62 received in the housing 63, the thermal load on the lubricating oil Lb in the transmission 60 is increased. However, even in this case, it is still possible to reliably suppress thermal deterioration of the lubricating oil Lb in the transmission 60 by taking the above-described measures.

In the present embodiment, the housing 14 of the rotating electric machine 10 and the housing 63 of the transmission 60 are first formed separately from each other and then joined together into one piece.

With the above configuration, it becomes more difficult for heat generated in the rotating electric machine 10 to be transmitted to the transmission 60 in comparison with the case of integrally molding the housings 14 and 63 as a single component.

In the present embodiment, the second coil end part 33B is located closer than the first coil end part 33A to the dividing surface of the assembly of the rotating electric machine 10 and the transmission 60 (or the boundary between the rotating electric machine 10 and the transmission 60).

As described previously, the axial protruding height H2 of the second coil end part 33B from the second axial end face of the stator core 31 is larger than the axial protruding height H1 of the first coil end part 33A from the first axial end face of the stator core 31. Therefore, the durability of the stator 13 against vibration stress or the like is lower at the second coil end part 33B than at the first coil end part 33A. Accordingly, locating the second coil end part 33B as above, the maintainability of the electric drive apparatus 1 is improved. Moreover, the boundary between the rotating electric machine 10 and the transmission 60 is generally located away from the mounting area where the electric drive apparatus 1 is mounted to the vehicle. Therefore, the road-surface vibration stress is lower at the transmission-side end of the rotating electric machine 10 than at the anti-transmission-side end of the rotating electric machine 10. Accordingly, locating the second coil end part 33B as above, the durability of the entire electric drive apparatus 1 can be improved.

While the above particular embodiment has been shown and described, it will be understood by those skilled in the art that various modifications, changes and improvements may be made without departing from the spirit of the present disclosure.

Figure 5:
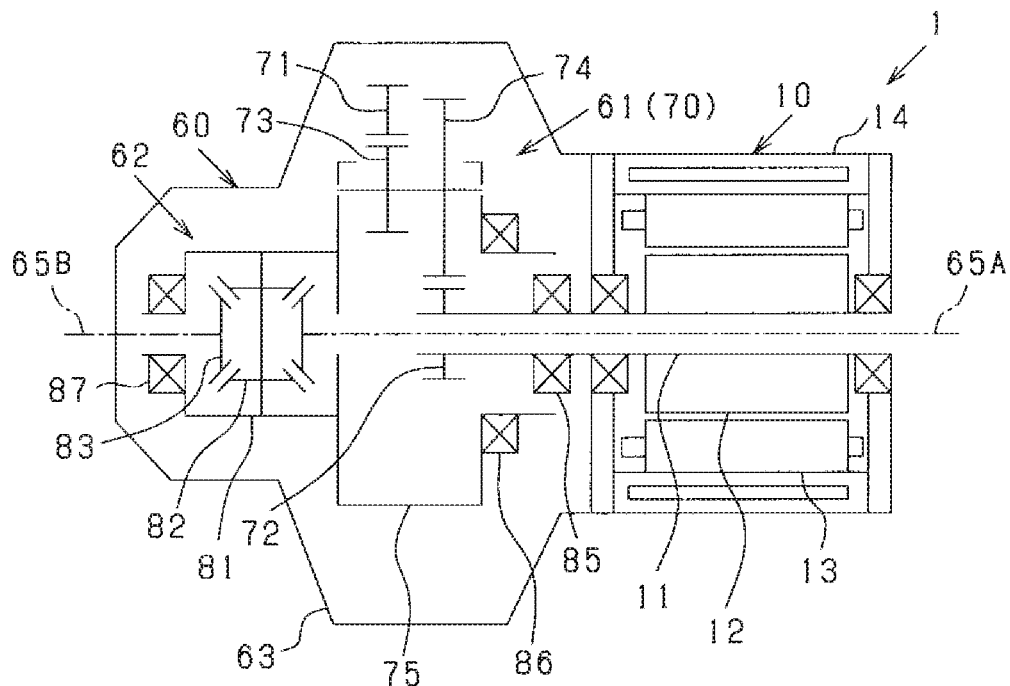
FIG. 5 is a schematic diagram illustrating the configuration of the transmission according to the exemplary embodiment.

(1) For example, in the above-described embodiment, the transmission 60 is configured as shown in FIG. 5.

Figure 6:
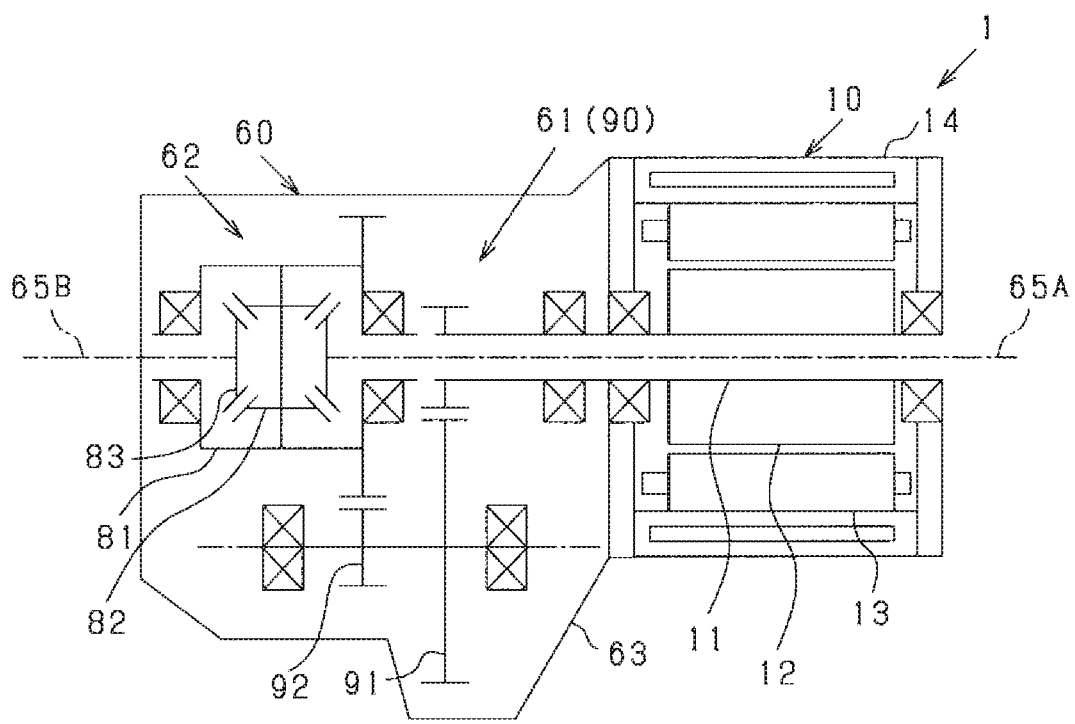
FIG. 6 is a schematic diagram illustrating the configuration of a transmission according to a modification.

As an alternative, the transmission 60 may have a configuration as shown in FIG. 6. In this configuration, the rotating electric machine 10 and the transmission 60 are arranged coaxially with each other. The motive power transmitting unit 61 of the transmission 60 is implemented by a helical gear mechanism 90. The helical gear mechanism 90 includes a plurality of helical gear pairs having different speed reduction ratios (this is the same in FIGS. 7 and 8 to be described later). More specifically, the helical gear mechanism 90 includes, for example, a first gear pair 91 configured to rotate with rotation of the rotating shaft 11 and a second gear pair 92 configured to make the case 81 of the differential 62 rotate with rotation of the first gear pair 91. During rotation of the rotating shaft 11 (i.e., during rotation of the rotor 12), both the gear pairs 91 and 92 also rotate, causing the pair of output shafts 65A and 65B to rotate coaxially with the rotating shaft 11.

Figure 7:
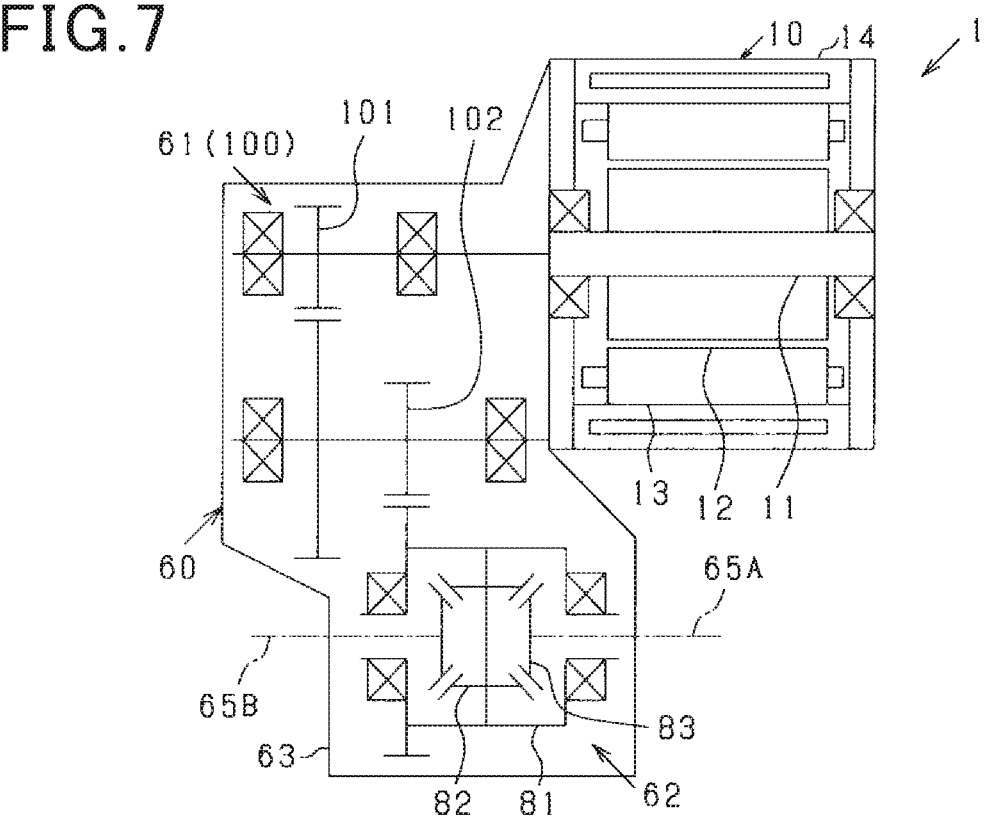
FIG. 7 is a schematic diagram illustrating the configuration of a transmission according to another modification.

As another alternative, the transmission 60 may have a configuration as shown in FIG. 7. In this configuration, the rotating electric machine 10 and the transmission 60 are of a multi-axis type. The motive power transmitting unit 61 of the transmission 60 is implemented by a helical gear mechanism 100. The helical gear mechanism 100 includes, for example, a first gear pair 101 configured to rotate with rotation of the rotating shaft 11 and a second gear pair 102 configured to make the case 81 of the differential 62 rotate with rotation of the first gear pair 101. During rotation of the rotating shaft 11 (i.e., during rotation of the rotor 12), both the gear pairs 101 and 102 also rotate, causing the pair of output shafts 65A and 65B to rotate about a different axis from the rotating shaft 11.

Figure 8:
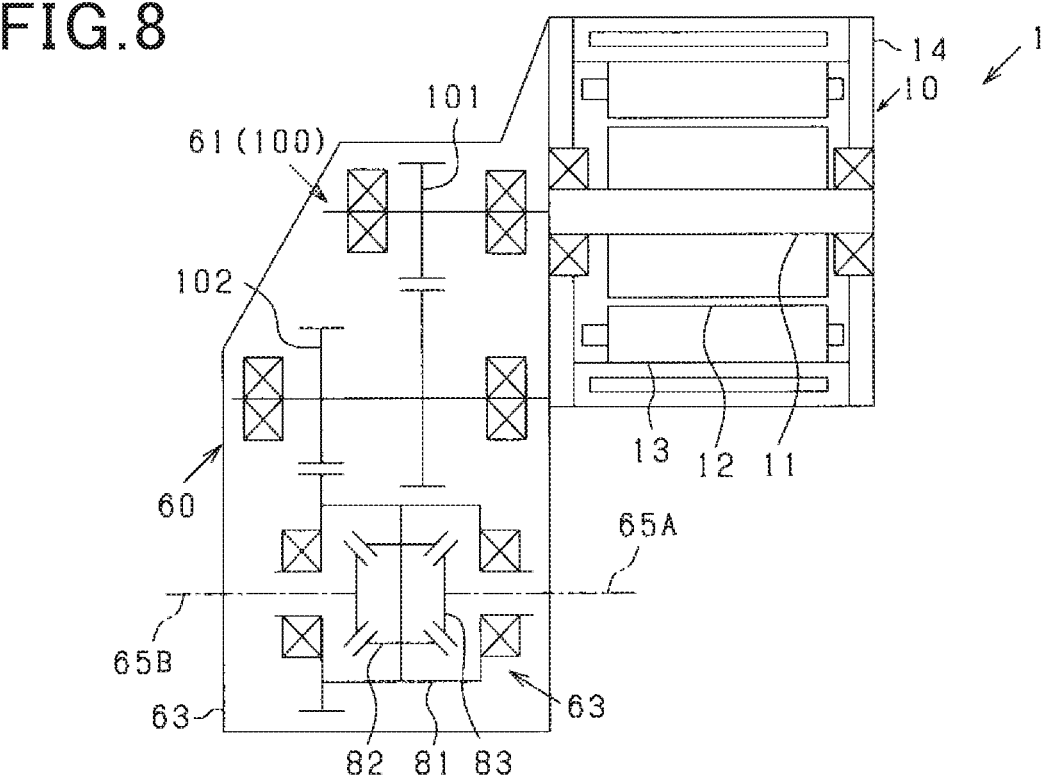
FIG. 8 is a schematic diagram illustrating the configuration of a transmission according to yet another modification.

As yet another alternative, the transmission 60 may have a configuration as shown in FIG. 8. This configuration differs from the above-described configuration shown in FIG. 7 only in the axial locations of the first and second gear pairs 101 and 102.

(2) In the above-described embodiment, the housing 63 of the transmission 60 has both the motive power transmitting unit 61 and the differential 62 received therein. As an alternative, the housing 63 may have only the motive power transmitting unit 61 received therein (i.e., no differential 62 received therein).

Moreover, in the above-described embodiment, the motive power transmitting unit 61 is of a gear type. As an alternative, the motive power transmitting unit 61 may be of a friction type (i.e., a type of transmission that transmits motive power by surface friction).

(3) In the rotating electric machine 10, the rotating shaft 11 may be configured to axially protrude from the rotor 12 more on the transmission 60 side than on the opposite side to the transmission 60. In other words, the axial protruding length of the rotating shaft 11 from the rotor 12 may be set to be larger on the transmission 60 side (i.e., the left side in FIG. 1) than on the opposite side to the transmission 60 (i.e., the right side in FIG. 1).

Setting the axial protruding length of the rotating shaft 11 as above, it becomes more difficult for heat generated in the rotor 12 to be transmitted to the transmission 60 via the rotating shaft 11. Consequently, it becomes possible to more reliably suppress thermal deterioration of the lubricating oil Lb in the transmission 60.

(4) In the above-described embodiment, the housing 14 of the rotating electric machine 10 and the housing 63 of the transmission 60 are first formed separately from each other and then joined together into one piece.

As an alternative, the housings 14 and 63 may be integrally molded as a single component.

(5) In the above-described embodiment, each of the phase windings of the stator coil 32 is formed of a plurality of substantially U-shaped electrical conductor segments 40.

As an alternative, each of the phase windings of the stator coil 32 may be formed of a plurality of sub-windings that are wound on the stator core 31 and connected in series with each other. In this case, each of the sub-windings is formed of a single electric wire having a substantially rectangular cross section. Each of the sub-windings is wound on the stator core 31 at a predetermined pitch to have a plurality of turn portions 42 on both the axial sides of the stator core 31; the turn portions 42 are formed by bending. That is, each of the first and second coil end parts 33A and 33B includes the turn portions 42 of the sub-windings. Moreover, the second coil end part 33B also includes joints at each of which one corresponding pair of end portions of the sub-windings are joined together. In addition, as in the above-described embodiment, the second coil end part 33B is located on the same axial side of the stator core 31 as the transmission 60 whereas the first coil end part 33A is located on the opposite axial side of the stator core 31 to the transmission 60.

(6) In the above-described embodiment, the stator coil 32 is a three-phase coil which has the U-phase, V-phase and W-phase windings star-connected (or Y-connected) with each other.

As an alternative, the U-phase, V-phase and W-phase windings of the stator coil 32 may be Δ-connected with each other.

Moreover, the number of phases of the stator coil 32 may alternatively be two, four or more.

(7) In the above-described embodiment, the rotating electric machine 10 is configured as an inner rotor type rotating electric machine where the rotor 12 is located radially inside the stator 13.

As an alternative, the rotating electric machine 10 may be configured as an outer rotor type rotating electric machine where a rotor is located radially outside a stator.

What is claimed is:

1. An electric drive apparatus comprising:
   a rotating electric machine including:
      a rotor provided on a rotating shaft such that the rotor rotates together with the rotating shaft,
      a stator including an annular stator core and a multiphase stator coil, and
      a first housing that houses both the rotor and the stator; and
   a transmission including:
      a motive power transmitting unit configured to rotate with rotation of the rotating shaft, and
   a second housing that houses the motive power transmitting unit, the second housing being configured to contain lubricating oil to lubricate the motive power transmitting unit, wherein:
      the second housing is integral with the first housing on one side of the rotating electric machine in an axial direction of the rotating shaft,
      the stator coil is assembled to the stator core and includes:
         a first coil end part protruding from a first axial end face of the stator core,
         a second coil end part protruding from a second axial end face of the stator core, and
         a plurality of phase windings, each of the plurality of phase windings having a plurality of turn portions formed by bending and a plurality of joints that respectively join sections of the plurality of phase windings;
      the plurality of turn portions are at the first coil end part of the stator coil and the plurality of joints are at the second coil end part of the stator coil; and
      the second coil end part, which includes the plurality of joints, is located on a same axial side of the stator core as the transmission, and the first coil end part, which includes the turn portions, is located on an opposite axial side of the stator core to the transmission.

2. The electric drive apparatus as set forth in claim 1, wherein:
   for each of the plurality of phase windings of the stator coil, the sections of the phase winding are respectively formed of electrical conductor segments,
   each of the electrical conductor segments is U-shaped, and formed by a pair of straight portions that extend parallel to each other and are connected to each other by the turn portions, the turn portions being on the opposite axial side of the stator core relative to the transmission, and
   each corresponding pair of distal end portions of the electrical conductor segments are joined together at one of the joints on the same axial side of the stator core as the transmission.

3. The electric drive apparatus as set forth in claim 1, wherein each of the joints is a weld formed by welding the sections of the respective phase winding to each other.

4. The electric drive apparatus as set forth in claim 1, wherein on the same axial side of the stator core as the transmission, a neutral point of the stator coil is defined by a neutral joint at which end portions of the phase windings of the stator coil are joined together.

5. The electric drive apparatus as set forth in claim 1, further comprising, on the same axial side of the stator core as the transmission, a plurality of busbars through each of which electric power is inputted to and outputted from one of the phase windings of the stator coil.

6. The electric drive apparatus as set forth in claim 1, wherein each of the sections of the phase windings of the stator coil has a rectangular cross section.

7. The electric drive apparatus as set forth in claim 1, wherein:
   the first housing has a tubular part to which the stator core is assembled,
   an annular coolant passage is formed in the tubular part of the first housing through which coolant flows,
   the coolant passage extends axially outside the stator core at both the axial sides of the stator core, and
   a dimensional relationship of D1<D2 is satisfied, where D1 is an axial distance between the stator core and a first axial end of the coolant passage on the opposite axial side of the stator core to the transmission, and D2 is an axial distance between the stator core and a second axial end of the coolant passage on the same axial side of the stator core as the transmission.

8. The electric drive apparatus as set forth in claim 1, wherein:
   the transmission has a rotation inputting portion via which the rotation of the rotating shaft is inputted and transmitted to the motive power transmitting unit, and an amount of the lubricating oil provided in the second housing is such that part of the motive power transmitting unit is immersed in the lubricating oil without immersing the rotation inputting portion in the lubricating oil.

9. The electric drive apparatus as set forth in claim 1, wherein:
the rotating electric machine further includes a terminal member via which electric power is inputted to and outputted from each of the phase windings of the stator coil,
in the first housing, a through-hole is formed through which the terminal member extends from an inside of the first housing to an outside of the first housing, and
the through-hole is located closer to the transmission than the stator core along an axial direction of the rotating electric machine.

10. The electric drive apparatus as set forth in claim 1, wherein:
the electric drive apparatus is configured to be used as a motive power source in a vehicle to generate motive power for rotating left and right wheels of the vehicle, and
the transmission further includes a differential that is received in the second housing and connected with a pair of output shafts via which the motive power is outputted to the left and right wheels of the vehicle.

11. The electric drive apparatus as set forth in claim 1, wherein an axial protruding height of the second coil end part from the second axial end face of the stator core is larger than an axial protruding height of the first coil end part from the first axial end face of the stator core.

\* \* \* \* \*